United States Patent [19]

Jorgensen

[11] Patent Number: 4,533,285
[45] Date of Patent: Aug. 6, 1985

[54] CUTTING ATTACHMENT FOR BORING TOOL

[75] Inventor: Charles A. Jorgensen, Antioch, Ill.

[73] Assignee: Everede Tool Company, Chicago, Ill.

[21] Appl. No.: 502,502

[22] Filed: Jun. 9, 1983

[51] Int. Cl.³ .............................................. B23B 51/08
[52] U.S. Cl. .................................... 408/191; 408/195; 408/197; 408/224
[58] Field of Search ............... 408/191, 193, 195, 201, 408/210, 211, 214, 219, 220, 224, 225, 230; 144/219; 145/116 R

[56] References Cited

U.S. PATENT DOCUMENTS

| | | | |
|---|---|---|---|
| 532,472 | 1/1895 | Minnich | 408/193 X |
| 1,158,532 | 11/1915 | Moles | 408/224 |
| 2,340,941 | 2/1944 | Dietz | 408/191 |
| 2,358,608 | 9/1944 | Turner | 408/224 X |
| 3,575,520 | 4/1971 | Halpern | 408/191 |

FOREIGN PATENT DOCUMENTS 26097 of 1912 United Kingdom ............... 408/191

*Primary Examiner*—Z. R. Bilinsky
*Attorney, Agent, or Firm*—Robert E. Wagner; Ralph R. Rath

[57] ABSTRACT

An attachment for use with a tool having a cutting surface on one end of a bar consists of a collar that has an opening corresponding substantially to the cross-sectional configuration of the bar and is frictionally supported thereon in any angular or axially-orientation. The collar has a support opening which receives a cutter insert that has its inner end supported on an abutment and is releasably retained within the support opening by a recessed fastener.

13 Claims, 6 Drawing Figures

U.S. Patent  Aug. 6, 1985  4,533,285
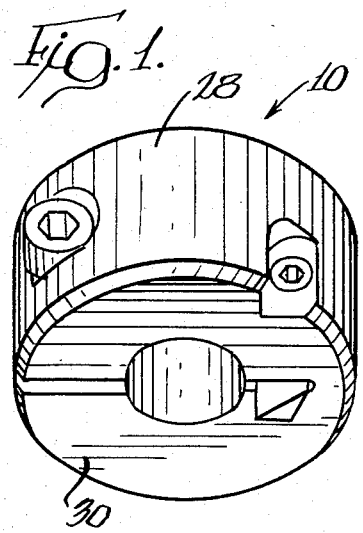
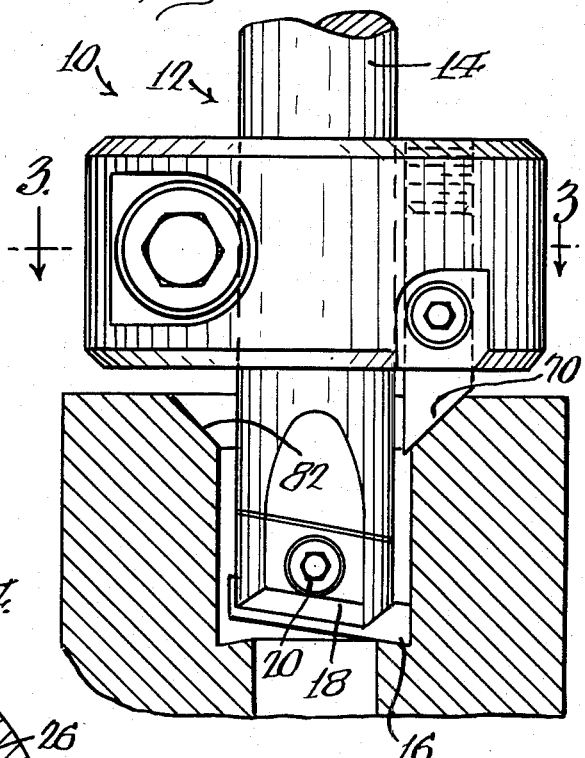
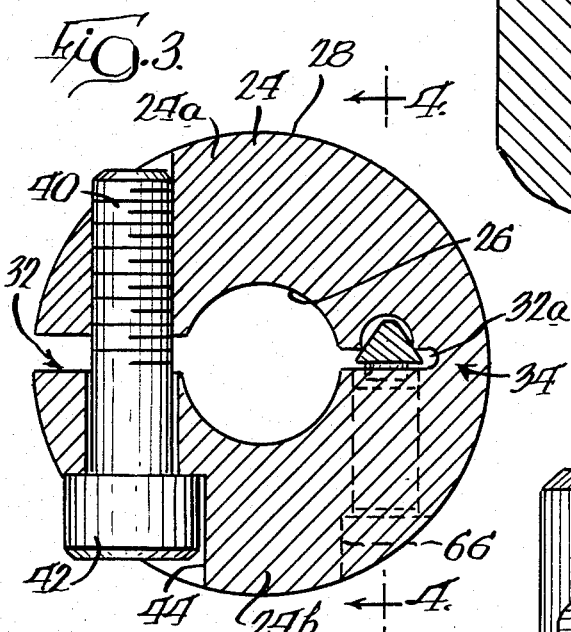
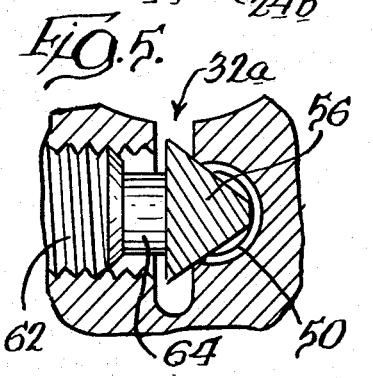
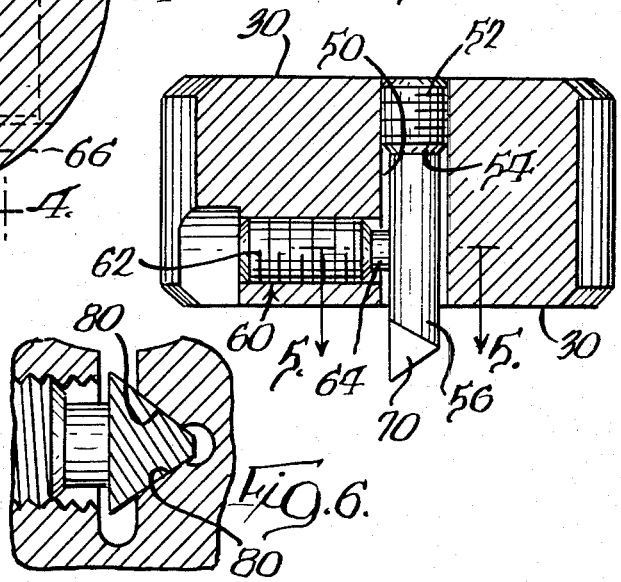

CUTTING ATTACHMENT FOR BORING TOOL

DESCRIPTION

1. Technical Field

The present invention relates generally to boring devices and is particularly concerned with an improved attachment for such boring devices so that two cutting functions can be performed simultaneously with one tool.

2. Background Prior Art

Boring bars have been in existence for decades, and one type of boring bar that has received a remarkable degree of commercial success is the type that is disclosed in expired U.S. Pat. No. 2,310,992. The boring bar that is disclosed in this patent consists of a large rigid circular bar that has a removable cutting element releasably attached to the lowr end and is primarily designed for counter-sinking or counter-boring of holes. The removable and disposable cutting element utilized with this type of boring device has been extremely successful in that the boring bars themselves have an infinite lifetime.

In many instances, it is necessary or desirable to perform some other function on the workpiece, such as providing a chamfer on the end of the hole that has just been bored. Present practice requires a separate operation using a counter-sinking tool for producing the chamfer or other working of the surface of the workpiece. An example of one type of counter-sinking or chamfering tool is disclosed in U.S. Pat. Nos. 4,197,042 and 4,293,254, assigned to the Assignee of the present application. While the separate operations are satisfactory and produce a desired end product, the cost of performing two separate operations increases the cost of the overall product.

SUMMARY OF THE INVENTION

According to the present invention, a removable attachment is provided for a boring tool having a cutting element on one end thereof. The attachment is universally adjustable with respect to the tool so that a chamfer or other operation can be performed simultaneously with the boring of a hold in a workpiece.

More specifically, the attachment consists of a collar that is split from the peripheral surface and has an opposed integral area defining a hinge with a fastener extending across the split area of the collar so that the fastener is operational to frictionally grip the collar on the workpiece at any circumferentially or axially spaced location on the boring tool. The collar has a support opening for supporting a cutting insert that is releasably retained within the collar.

In a specific embodiment, the support opening is defined by a threaded opening that extends between opposed surfaces and receives a threaded abutment that defines a supporting surface located between the opposed surfaces of the collar which supports the inner end of the cutting insert that has an exposed cutting edge that extends towards the cutting end of the boring tool.

Thus, a second cutting operation, such as chamfering of the hole, can be performed simultaneously with the formation of the hole, reducing the overall cost. The frictional gripping of the collar on the bar of the boring tool allows for universal adjustment of the attachment with respect to the bore without marring the surface of the boring bar.

BRIEF DESCRIPTION OF SEVERAL VIEWS OF DRAWINGS

FIG. 1 is a perspecive view of the attachment of the present invention;

FIG. 2 is a view of the attachment as it appears with the boring tool or drilling tool in one manner of operation;

FIG. 3 is a cross-sectional view, as viewed along lines 3—3 of FIG. 2 with the boring tool being eliminated;

FIG. 4 is a cross-sectional view, as viewed along lines 4—4 of FIG. 3;

FIG. 5 is a cross-sectional view, as viewed along lines 5—5 of FIG. 4; and,

FIG. 6 is a view similar to FIG. 5 showing a modified form of the invention.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

FIG. 1 of the drawings discloses the attachment, generally designated by reference numeral 10, constructed in accordance with the teachings of the present invention. The attachment 10 is specifically adapted for use with a boring tool, generally designated by reference numeral 12, constructed generally as disclosed in U.S. Pat. No. 2,310,992, incorporated herein by reference. The conventional, commercially-available boring tool consists of a generally circular supporting bar 14 having a removable cutting element 16 releasably retained on the cutting end of the bar 14 by a holder 18 secured to the bar 14 by a fastener 20.

The attachment 10 consists of a generally circular ring or collar 24 that has a generally circular opening 26 which corresponds to the configuration of the boring bar 14. Attachment or tool 10 also has a peripheral surface 28 and opposed, generally flat surfaces 30.

The collar has a slit or slot 32 extending from the peripheral surface to the opening, across the opening and has a portion 32a extending from the opening and terminating short of the peripheral surface 28 to define what may be termed an integral hinge 34. The split 32, in essence, divides the collar or ring 24 into two, collar halves 24a and 24b. Retainer means in the form of an allen-headed threaded screw 40 interconnects the collar halves 24a and 24b diametrically opposed from hinge 34. The allen-headed screw extends across slit 32 and has a head end 42 located in a recess 44 extending from peripheral surface 28. The screw 40 extend chordally of the opening 26 and is operable to vary the size of the opening 26 to frictionally grip the attachment or holder 10 on bar 14. Of course, during this movement, the two collar halves 24a and 24b move about the integral hinge 34.

The collar 24 has a support opening 50 that extends between opposed surfaces 30 and also extends partially into slit 32a, as clearly illustrated in FIG. 5. Preferably, the support opening or insert opening 50 is threaded and receives a threaded abutment member 52 that is in the form of a recessed set screw which defines an abutment 54.

A cutting insert 56 is supported within the support opening and rests on abutment 54, as clearly illustrated in FIG. 4. The cutting insert 56 is releasably retained within the insert opening by a further retaining means, generally illustrated at 60 in FIG. 4. The retainer means 60 is preferably an allen-head screw 62 that has a nylon or brass insert 64 received into an opening (not shown). The head of the screw 62 is supported within a recess 66 defined in the peripheral surface 28 of the collar 24, as shown in FIG. 2. The insert 64 is preferably a brass or nylon member that is utilized for engaging one surface of the generally triangularly-shaped cutting insert 56. Thus, the cutting insert 56 is releasably retained by having extended engagement between the insert 64 and a surface of the cutting insert 56. In the inserted position illustrated in FIG. 4, the cutting edge 70 extends beyond the surface 30 towards the end of the bar 14 having the cutting element 16 thereon.

Utilizing the frictional grip with the structure described above has significant advantages over various other types of securing means, such as penetrating screws having coned ends defining a point, or a key-and-slot arrangement, which are conventional. As can be appreciated when utilizing a penetrating screw, the surface of the bar 14 will tend to be marred or punctured to a small degree each time the tool or attachment is moved to a different position. Ultimately, this would cause problems in accurate positioning and aligning of the tool axially and circumferentially on the bar 14. While the cutting element 70 can be positioned in any position circumferentially of the bar 14, the cutting edge 70 is preferably in a position that is approximately 90° offset from the cutting edge 16 to prevent chattering during the boring operation.

A slightly modified form of the invention is illustrated in FIG. 6, wherein the opening is modified to be in the form of a triangular member having flat walls 80 that have an angular orientation and define an included angle corresponding to the included angle of the triangular cutting element. Of course, the triangular cutting element is a standard item that is commercially available and is inexpensive.

With the structure described above, a separate chamfering operation can be simultaneously performed at the end of the stroke of the boring tool. Furthermore, the attachment can fit any number of commercially-available tools and can be sold as an accessory, which is relatively inexpensive when compared to the counter-boring tools presently in existence. Utilization of the replaceable insert 56 gives the attachment or collar indefinite working life.

Of course, various modifications come to mind without departing from the spirit of the invention. For example, the opening 50 could easily be positioned in any position circumferentially of the collar, rather than being located at the slit 32a. Also, in some instances, it may be desirable to have two support openings for two separate cutting tools, which, in such instances, would preferably be diametrically opposed from each other. Such arrangement may be desirable if a double-angle chamfer 82 were desired. The tool is also not limited to a chamfering or counter-boring operation, but could also be utilized for other purposes, such as providing a groove around the opening created by the boring tool 12.

While the collar 28 has been shown as being in the form of two halves 24a and 24b interconnected by an integral hinge, in certain environments, it may be desirable to have two completely separate collar halves interconnected by two fasteners, such as fastener 40. It is envisioned that if the separate collar halve arrangement were desired, the support opening 50 would be located at about midpoint of each collar half. If such arrangement were desired, it would be possible to have the two collar halves made identical and mirror images of each other to decrease the inventory required. Of course, in certain instances, it may not be necessary to have the support opening 50 extend entirely through the collar and utilize a threaded, recessed fastener 52. Since the tool or attachment is universally adjustable with respect to the bar 14, the opening need only extend from lower surface 30 a sufficient distance to support the insert or the cutting edge in an exposed manner. Thus, the abutment 54 would be an integral part of the collar 24.

As can be appreciated from the above description, the attachment of the present invention provides an expedient, inexpensive time- and cost-saving accessory that can be utilized with any of the boring devices that already are in existence.

I claim:

1. In combination with a boring tool having a cutting element adjacent an end of a bar for producing a hole in a working surface, a chamfering tool carried by said bar spaced from said cutting element for simultaneously producing a chamfer extending from said working surface to said hole, said chamfering tool comprising a collar having a slit dividing said collar into collar halves connected by an integral hinge with a fastener extending across said slit to releasably retain said collar on said bar, a removable cutting insert carried by said collar with a portion in said slit and having a cutting edge extending toward said end of said bar for simultaneously producing said chamber in said hole, and retainer means extending through said collar into said slit and engage said portion.

2. The combination as defined in claim 1, in which said collar has a central opening receiving said bar.

3. The combination as defined in claim 1, in which said retainer means includes a fastener extending substantially perpendicular to said slit.

4. The combination as defined in claim 1, in which said collar has an insert opening extending between opposed surfaces, further including an adjustable abutment received into said insert opening and terminating between opposed surfaces with said cutting insert supported on said abutment.

5. The combination as defined in claim 4, in which said adjustable abutment and said releasable retainer means each comprise a recessed adjusting screw.

6. In combination with a boring tool having a cutting element extending perpendicular to an end of a circular bar for producing a hole in a working surface of a workpiece, an attachment having an opening receiving said bar and being axially and circumferentially adjustable thereon, said attachment comprising a collar split to define collar halves interconnected by an integral hinge, said collar having a slit extending from said opening to define said integral hinge, a fastener extending chorally of said opening and interconnecting said collar halves diametrically opposite said integral hinge and movable to frictionally grip said collar on said bar, said collar having an insert opening extending between opposed surfaces and in communication with said slit, an abutment member received into said insert opening defining an abutment between said opposed surfaces, a removable cutting insert received into said insert opening and having a cutting edge exposed toward said end of said circular bar, and releasable retainer means retaining said cutting insert in said insert opening.

7. The combination as defined in claim 6, in which said insert opening is a threaded opening and said abutment member is a threaded screw.

8. An attachment for use with a tool having a cutting surface on one end of a bar, comprising a collar having an opening corresponding substantially to a cross-sectional configuration of said bar with said collar having a slit extending from a peripheral surface across the opening and separating said collar into collar halves with said slit terminating from said peripheral surface to define an integral hinge, fastener means carried by said collar extending across said slit operable to vary the size of said opening, means defining a support opening extending from a surface of said collar and intersecting said slit, a cutting insert received into said support opening and having a portion extending past said surface, and retaining means releasably retaining said cutting insert in said support opening so that said collar can be positioned to have said portion extending past said surface at any angular and axial position with respect to said bar.

9. An attachment as defined in claim 8, in which said support opening extends between opposed surfaces of said collar, further including an abutment member received into said support opening and defining an abutment between said opposed surfaces for said cutting insert.

10. An attachment as defined in claim 9, in which said support opening is a threaded opening and said abutment member is a threaded screw.

11. An attachment as defined in claim 10, in which said cutting insert is generally triangular in cross-section and said retaining means is a recessed adjusting screw having an inner end engaging said cutting insert.

12. An attachment as defined in claim 8, in which said opening has flat walls leading from said slit and said cutting insert is triangular in cross-section.

13. An attachment as defined in claim 8, in which said collar has a retaining opening leading to said support opening and said retaining means is received in said retaining opening.

* * * * *